(12) United States Patent
Wunderlich et al.

(10) Patent No.: US 10,439,839 B2
(45) Date of Patent: Oct. 8, 2019

(54) FIELD-DEVICE COUPLING UNIT AND SYSTEM

(71) Applicant: FESTO AG & Co. KG, Esslingen (DE)

(72) Inventors: Steffen Wunderlich, Aichtal (DE); Stefan Beuel, Walddorfhaslach (DE)

(73) Assignee: FESTO AG & CO. KG, Esslingen (DE)

( * ) Notice: Subject to any disclaimer, the term of this patent is extended or adjusted under 35 U.S.C. 154(b) by 76 days.

(21) Appl. No.: 15/751,537

(22) PCT Filed: Aug. 12, 2015

(86) PCT No.: PCT/EP2015/068553
§ 371 (c)(1),
(2) Date: Feb. 9, 2018

(87) PCT Pub. No.: WO2017/025140
PCT Pub. Date: Feb. 16, 2017

(65) Prior Publication Data
US 2018/0234263 A1    Aug. 16, 2018

(51) Int. Cl.
| | | |
|---|---|---|
| H04L 12/40 | (2006.01) | |
| H02J 13/00 | (2006.01) | |
| H04B 3/54 | (2006.01) | |
| H04L 25/02 | (2006.01) | |

(52) U.S. Cl.
CPC .... *H04L 12/40032* (2013.01); *H02J 13/0044* (2013.01); *H04B 3/548* (2013.01); *H04L 12/40045* (2013.01); *H04L 25/0264* (2013.01); *H04L 2012/4026* (2013.01); *H04L 2012/40208* (2013.01)

(58) Field of Classification Search
CPC .................................................. H04L 12/40032
See application file for complete search history.

(56) References Cited

U.S. PATENT DOCUMENTS

2005/0144437 A1* 6/2005 Ransom ............. G06F 1/28
713/151

FOREIGN PATENT DOCUMENTS

| DE | 19813700 | 9/1999 |
|---|---|---|
| DE | 102006011595 | 9/2007 |
| EP | 2530809 | 12/2012 |

* cited by examiner

*Primary Examiner* — Daniel J Cavallari
(74) *Attorney, Agent, or Firm* — Hoffmann & Baron, LLP

(57) ABSTRACT

Field-device coupling unit for providing a supply voltage for a field device and for communication with a superordinate control unit, the field-device coupling unit including a current interface, which is configured for communication with the control unit and has a first controllable input load which is configured to provide, from an interface current of the current interface, a load voltage on which the supply voltage is based, the field-device coupling unit further including a circuit arrangement for providing a communication signal which is to be transmitted to the control unit, wherein the circuit arrangement is configured to control the first controllable input load according to the communication signal in order to superimpose the interface current with a current signal corresponding to the communication signal.

15 Claims, 4 Drawing Sheets

FIELD-DEVICE COUPLING UNIT AND SYSTEM

This application claims priority based on an International Application filed under the Patent Cooperation Treaty, PCT/EP2015/068553, filed Aug. 12, 2015.

BACKGROUND OF THE INVENTION

The invention relates to a field-device coupling unit for providing a supply voltage for a field device and for communication with a superordinate control unit, the field-device coupling unit comprising a current interface which is configured for communication with the control unit and has a first controllable input load which is configured to provide, from an interface current of the current interface, a load voltage on which the supply voltage is based, the field-device coupling unit further comprising a circuit arrangement for providing a communication signal to be transmitted to the control device.

A field-device coupling unit of the type described above is known from the prior art and is used to connect a field device to a superordinate control unit via a current interface.

The field-device coupling unit fulfils primarily two functions. Firstly, the field-device coupling unit is used to provide a supply voltage for the field device based on the interface current of the current interface. Secondly, the field-device coupling unit makes it possible to communicate with the control unit by means of the current interface.

In order to fulfil the first function—i.e. providing a supply voltage—the known field-device coupling unit comprises a controllable input load which is preferably connected in series in the current interface, and the load voltage of which—i.e. the voltage which drops over the input load—is the basis of the supply voltage; that is, said load voltage is used as a supply voltage or as a basis for the supply voltage. The controllable input load is intended to ensure in particular that the load voltage remains within a specific voltage range so that said voltage can be used as a supply voltage or as a basis for the supply voltage. Depending on the configuration of the controllable input load, said input load can also meet specific requirements for explosion protection, for example in that currents and/or voltages associated with the input load are limited to such an extent that a minimum ignition energy of an explosive mixture is not reached.

As mentioned above, the second function of the field-device coupling unit consists in allowing communication between the field device and the superordinate control unit by means of the current interface. In this context, the basic principle of the communication shall firstly be explained. Conventionally, for communication by means of a current interface, the communication signal to be transmitted has been mapped onto the current level of the interface current. However, since, in this way, only very low data-transmission rates can be achieved, a transmission process has been developed in which the interface current is superimposed with a frequency-modulated current signal which contains the information to be transmitted. For example, the HART (highway addressable remote transducer) protocol is based on a transmission process of this type. Here, according to the principle of frequency shift keying, various transmission symbols are mapped onto various frequencies which the current signal assumes sequentially over time. In this case, the frequencies are outside the normal spectrum of the interface current, and therefore the current signal is not disrupted by changes in the interface current.

In order to now superimpose said current signal on the interface current, in conventional field-device coupling units, specific superposition circuits are provided. Said superposition circuits increase the circuit complexity of the field-device coupling unit, as a result of which said unit is more difficult to produce, more complex and more prone to errors.

SUMMARY OF THE INVENTION

The object of the invention is that of achieving a superposition of the interface current with the current signal in a field-device coupling unit of the type described at the outset while minimising the required circuit complexity.

This object is achieved for a field-device coupling unit of the above-described type on the basis of the features defined in the characterising part of claim 1. According to the invention, the circuit arrangement—that is, the unit which provides the communication signal to be transmitted—is configured to control the first controllable input load according to the communication signal in order to thus superimpose the interface current with a current signal corresponding to the communication signal.

According to the invention, the first controllable input load, which is conventionally used to provide the field device with a voltage, is thus now also used to impress a current signal corresponding to the communication signal on the interface current.

Consequently, an existing means which is actually provided for a different function—that is, the first controllable input load—is advantageously now also used to superimpose the interface current with the current signal.

A separate superposition circuit, of the type used in the prior art, is therefore not necessary according to the present invention. Thus, the advantage of minimised circuit complexity is achieved, and the above-mentioned object is achieved.

The first controllable input load is a component from which a load voltage can be tapped. In particular, the controllable input load is a component of which the current/voltage characteristic changes, according to control by an electric control signal, in particular by an electric current or voltage, so that according to said control, the voltage dropping over the component can be varied.

By controlling the first controllable input load, the load voltage dropping over the input load is consequently varied. This in turn causes a change in the interface current flowing through the current interface. This change can also be considered to be a current signal which is superimposed on the interface current. In contrast with the interface current, which changes only slowly, and therefore can also be considered a DC or direct current signal, the current signal behaves in the manner of a superimposed AC component.

Expediently, the first controllable input load comprises three terminals, a first and a second terminal being connected in series with the current interface, and, by controlling the third terminal, the current/voltage characteristic between the first and the second terminal can be changed. The third terminal is for example a reference input.

As will be described in detail below, according to a preferred embodiment of the invention, the first controllable input load is a shunt voltage regulator.

The field-device coupling unit can be a part of a field device or can be a stand-alone unit in the manner of a module. In the first-mentioned case, the field-device coupling unit is for example formed integrally with one or more additional circuit portions of the field device. Preferably, in this case, the field-device coupling unit can be produced on the same printed circuit board as one or more additional circuit portions of the field device. Alternatively, the field-device coupling unit can also be in the form of a stand-alone unit, which can then preferably be connected to the field device via an interface and can be exchanged if required.

The superordinate control unit is preferably a control unit from the control level, which expediently receives state data and/or measured values from the field device or from the field-device coupling unit via the current interface, and which preferably under consideration of the state data and/or the measured values transmits control commands to the field device or the field-device coupling unit.

The field device can in principle be any field device which, by means of a field-device coupling unit of the type described at the outset, communicates by means of a current interface and is supplied with energy thereby. For example, the field device can be a control head/positioner which sets the valve-member position of a valve by means of an electric or pneumatic drive. The positioner is supplied with energy by means of the current interface and further transmits a communication signal by means of said current interface, which signal indicates for example the current position of the valve. The positioner is preferably a 2-conductor positioner.

The current interface is preferably based on an analogous current interface, such as on the known 4-20 mA current interface, so that the interface current can assume levels between 4 and 20 mA. As will be described below, the level of the interface current can also be fixed to a specific value so that the communication takes place exclusively by means of the superimposed current signal.

The current signal and the communication signal are preferably FSK or frequency shift keying signals. The current signal is in particular compatible with the HART protocol.

The circuit arrangement which provides the communication signal and controls the first controllable input load accordingly is preferably formed as an integrated circuit and/or from discrete components. Expediently, the circuit arrangement comprises at least one microcontroller, a FPGA and/or an ASIC (Application-Specific Integrated Circuit).

Advantageous developments of the invention are defined in the dependent claims.

According to a first embodiment, the first controllable input load comprises a voltage regulator, preferably a shunt voltage regulator, and the circuit arrangement is configured to control the voltage regulator according to the communication signal.

As already mentioned above, the first controllable input load preferably comprises a voltage regulator or is in the form of such. The voltage regulator is configured to generate the load voltage from the interface current. In particular, the voltage regulator is configured to keep the load voltage within a specific voltage range or at a specific voltage value, independently of the interface current.

The voltage regulator comprises in particular a reference input, by means of which the load voltage can be influenced. The communication signal is preferably coupled into said reference input.

Preferably, the voltage regulator is a shunt voltage controller or a shunt voltage regulator. For example, the component Zetex ZHT431 from the company Diodes Incorporated, or a component which has the same function as said component, can be used as a voltage regulator. The voltage regulator is for example in the form of an "Adjustable Precision Zener Shunt Regulator".

In a further embodiment, the first controllable input load is configured to limit the load voltage to a set voltage value.

Preferably, the first controllable input load assumes the function of a Zener diode—the load voltage dropping over the first controllable input load is limited to below or to a specific voltage value independently of the interface current.

Expediently, this voltage value can be set by connecting the first controllable input load in a specific manner. For example, the voltage value can be set by connection to two resistors which divide the load voltage and supply the divided load voltage to a reference input of the first controllable input load. The two resistors are connected as voltage divider. By selecting the two resistors, the voltage value can thus be set, to which or below which voltage value the load voltage is limited.

Expediently, the voltage value is set in such a way that a minimum ignition energy of an explosive mixture is not reached so that specific explosion protection requirements are met.

In a further embodiment, the current interface comprises a first and a second line connection, and the first controllable input load is connected in series between the two line connections.

In a further embodiment, the first controllable input load has a first reference input and is configured to change the load voltage according to a change in the voltage applied to the first reference input, and the circuit arrangement is configured to supply a first reference voltage to the first reference input and to superimpose the first reference voltage with the communication signal.

As has already been mentioned above, the first controllable input load preferably comprises a first reference input. By means of said reference input, the load voltage can be influenced. In principle, a first reference voltage is applied to the first reference input, which reference voltage is provided by the above-mentioned resistors which are connected as a voltage divider. Said first reference voltage is superimposed with the communication signal, preferably by means of capacitive coupling. Due to the relationship between the voltage applied to the reference input of the first controllable input load and the load voltage, the load voltage is varied according to the communication signal, as a result of which, in turn, a corresponding change in the interface current is brought about. This change in the interface current represents the current signal which can lastly be received by the superordinate control unit.

In a further embodiment, in parallel with the first controllable input load, at least one second controllable input load is connected, which comprises a second reference input, to which a second reference voltage is applied, and the reference inputs of the controllable input loads are connected in such a way that the first reference voltage is permanently below the second reference voltage.

The second controllable input load is provided in particular for reasons of redundancy in order to still achieve the above-described voltage limitation even in the case of failure of the first controllable input load. Preferably, the second controllable input load is configured in the same manner as the first controllable input load, but connected in a different manner. The second controllable input load is thus configured to be controllable in principle, but in contrast with the first controllable input load, it is not necessarily connected in a controllable manner; in particular a control path does not have to be provided between the circuit arrangement and the second reference input.

In the described parallel connection of the input loads, the problem can arise that the second input load dictates the load voltage dropping over the two input loads so that the first controllable input load is not capable of achieving the above-described change in the load voltage in order to impress the current signal on the interface current.

In order to solve this problem, the reference inputs of the two input loads are connected in such a way that the first reference voltage is permanently below the second reference voltage. If this is the case, then the input load having the lower reference voltage—and the resulting lower load voltage—always dictates the change in the load voltage and the change in the interface current. In the present case, this is the first controllable input load, which thus makes it possible to superimpose the interface current with the current signal in the described manner.

The reference voltages can be provided for example by means of voltage dividers, and the voltage divider which provides the second reference voltage can be configured in relation to the other voltage divider in such a way that the first reference voltage is below the second reference voltage. Preferably, the input loads are connected in such a way that the sum of a first reference voltage and a superimposed communication signal is also lower than the second reference voltage.

In the embodiment described, a plurality of second controllable input loads can also be present. The input loads are then connected in such a way that the reference voltage of the first controllable input load is lower than each reference voltage of the second controllable input loads.

In a further embodiment, it is provided that, in parallel with the first controllable input load, at least one second controllable input load is connected, which comprises a second reference input, to which a second reference voltage is applied, and that the circuit arrangement is configured, by operating a switch, to set the first reference voltage to below the second reference voltage and/or is configured, by operating a switch, to set the second reference voltage to above the first reference voltage.

This embodiment solves the above-mentioned problem—namely that in the case of input loads connected in parallel, the first controllable input load, in some circumstances, does not determine the load voltage—in an alternative manner.

Instead of the above-mentioned connection to permanently reduce the first reference voltage, in this case at least one switch is provided, by means of which the first reference voltage can be set to below the second reference voltage, or the second reference voltage can be set to above the first reference voltage.

The switch is operated by the circuit arrangement. In particular, the circuit arrangement is configured in such a way that the operation takes place only temporarily, specifically preferably only when the first controllable input load is to be used to transmit the communication signal.

In a further embodiment, it is provided that the circuit arrangement comprises a circuit branch which has the switch and preferably a resistor, the circuit branch preferably being connected between a ground node and the first or the second reference input.

Expediently, by means of the switch, the resistor is connected in parallel with a resistor of a voltage divider which belongs to the first or the second input load, or such a connection is disconnected. Thus, by operating the switch, the division ratio of the voltage divider belonging to the first or the second controllable input load can be changed selectively, and thus the respective reference voltage can be reduced or increased.

In a further embodiment, the circuit arrangement comprises a modem means which is configured to provide the communication signal to an output terminal, and a capacitor connected between the output terminal and the first reference input, and is configured to couple the communication signal provided to the output terminal into the first reference input by means of the capacitor.

In a further embodiment, between the output terminal of the modem means and the first reference input, a voltage divider assembly is provided, which is configured to scale the amplitude of the communication signal to be superimposed on the first reference voltage by a predetermined factor.

So that the current signal on the superordinate control unit can also easily be recognised as such, it is advantageous for said signal to have a specific amplitude. It is, however, possible that the first controllable input load, which is originally provided for the purpose of supplying a voltage and not to impress the current signal, is not configured by itself to impress the current signal with a level expected by the superordinate control unit on the current interface.

According to the present embodiment, this problem is solved in that the communication signal to be superimposed on the first reference voltage is scaled accordingly so that the change in the interface current brought about by the change in the load voltage—i.e. the current signal—has the amplitude expected by the superordinate control unit. For this purpose, according to the present embodiment, a corresponding voltage divider assembly is provided.

In a further embodiment, the voltage divider assembly is further used to provide the first reference voltage, the voltage divider assembly preferably being connected between a first connection point of the first controllable input load and a ground node.

As already mentioned above, the first reference voltage can be provided by means of a voltage divider. In an advantageous manner, said voltage divider now forms part of the above-mentioned voltage divider assembly which is used to scale the amplitude of the communication signal by a predetermined factor. The voltage divider assembly is thus advantageously used for two different purposes.

In a further embodiment, the field-device coupling unit is configured to operate the circuit arrangement based on the load voltage and/or the supply voltage.

Accordingly, the interface current provided by the current interface and the load voltage obtained therefrom are used to supply energy to the circuit arrangement. The circuit arrangement can be operated directly by the load voltage or, alternatively, by a supply voltage obtained from the load voltage. For example, for this purpose, a DC-to-DC converter can be provided between the load voltage and the supply voltage.

In a further embodiment, the current interface is a 4-20 mA current interface. Preferably, said current interface is a 4-20 mA current loop interface.

In a further embodiment, the field-device coupling unit is configured to communicate with the control unit by means of the current interface according to the HART protocol, the circuit arrangement preferably being configured to provide the communication signal in such a way that the current signal which is superimposed on the interface current is compatible with the HART protocol.

In particular, the circuit arrangement is configured in such a way that the communication signal—and accordingly also the current signal—are generated as a FSK or frequency shift keying signal which is compatible with the HART protocol, and the first controllable input load is controlled accordingly. Expediently, the current signal adopts a frequency of 1200 Hz or 2200 Hz according to the information to be transmitted or alternates between these two frequencies. Preferably, the peak-to-peak or the peak-to-valley value of the current of the signal is 1 mA.

In another embodiment, a system of at least one first and one second field-device coupling unit is provided. The first and second field-device coupling units are configured according to one of the above-described field-device coupling units. The current interfaces of the two field-device coupling units are connected in parallel with one another, and the circuit arrangement of at least one of the field-device coupling units is configured, at least whilst providing the communication signal to the first field-device coupling unit, to set a first reference voltage, which is applied to a reference input of the first controllable input load of the first field-device coupling unit, by operating a switch, to below a first reference voltage which is applied to a first reference input of the first controllable input load of the second field-device coupling unit, or is configured, at least whilst providing the communication signal to the first field-device coupling unit, to set the first reference voltage of the second field-device coupling unit, by operating a switch, to above the first reference voltage of the first field-device coupling unit.

According to this embodiment, two field-device coupling units or the current interfaces thereof are connected in parallel and can thus be connected to a single current interface of the superordinate control unit and be powered thereby. In this case, however, the problem already described above arises—namely that in the case of the parallel connection of two input loads, in each case the input load having the lower reference voltage dictates the load voltage dropping over the input loads. In order to solve this problem, in this embodiment, at least one of the two circuit arrangements is configured, by operating a switch, to decrease the respective reference voltage so that said voltage is below the reference voltage of the first controllable input load of the respective other field-device coupling unit.

BRIEF DESCRIPTION OF THE DRAWINGS

In the following, exemplary embodiments of the invention will be described with reference to the accompanying drawings, in which.

DETAILED DESCRIPTION OF THE PREFERRED EMBODIMENTS

In the following description of the drawings, the same reference signs are used for functionally like components in the embodiments shown, and a multiple description of functionally like components is omitted.

Figure 1:
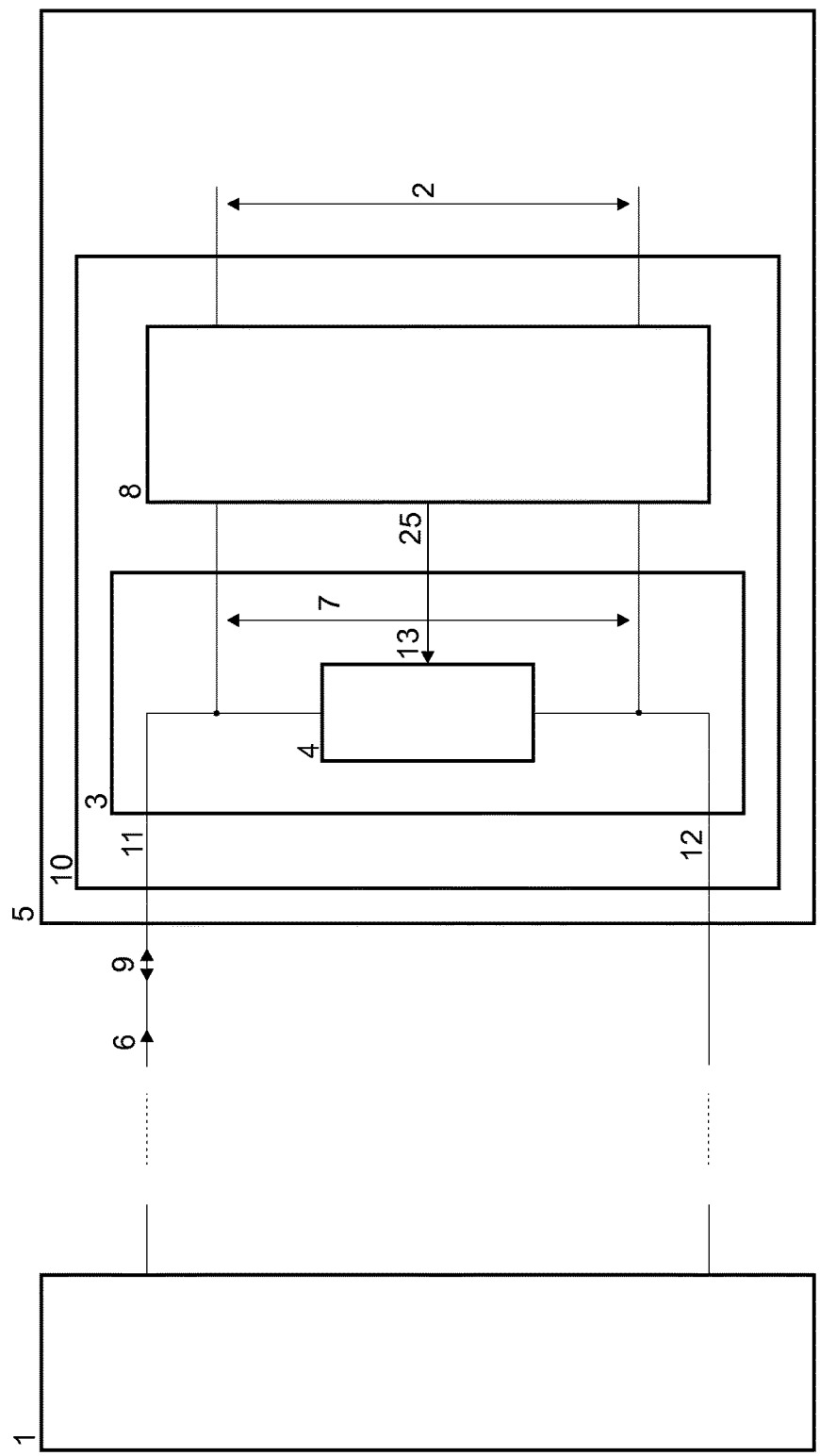
FIG. 1 is a schematic block diagram of a first embodiment of a field-device coupling unit in the context of a field device which is in communication with a superordinate control unit.

FIG. 1 is a schematic block diagram of a first embodiment of a field-device coupling unit 10 in the context of a field device 5 which is in communication with a superordinate control unit 1. The field device 5 and the superordinate control unit 1 are shown here in order to show the field-device coupling unit 10 in a typical application. However, the superordinate control unit 1 and the field device 5 are not required features of the present invention which, as explained at the outset, primarily relates to the field-device coupling unit 10 per se.

According to the first embodiment, the field-device coupling unit 10 is integrated in the field device 5. Alternatively, the field-device coupling unit 10 can also be configured to be structurally separate and can be inserted in the field device 5 as a module or can be placed on said device.

The field-device coupling unit 10 is used to provide a supply voltage 2 for the field device 5 and for communication with the superordinate control unit 1 by means of a current interface 3. An interface current 6 flows through the current interface 3, which interface current is preferably provided by the superordinate control unit 1.

The current interface 3 comprises the two line connections 11 and 12, between which the first controllable input load 4 is preferably connected in series. The line connections 11 and 12 are connected to a current interface of the superordinate control unit 1 via lines and thus form a current loop together with the current interface 3.

The current interface 3 comprises a first controllable input load 4, which is configured to provide, from the interface current 6, a load voltage 7 on which the supply voltage 2 is based. The load voltage 7 drops over the first controllable input load 4.

The field-device coupling unit 10 further comprises a circuit arrangement 8 for providing a communication signal 25 to be transmitted to the control unit 1. To transmit the communication signal 25 to the control unit 1, a current signal 9 corresponding to the communication signal 25 is superimposed on the interface current 6.

For this purpose, the circuit arrangement 8 is configured to control the first controllable input load 4 according to the communication signal 25 in order to thereby superimpose the interface current 6 with the current signal 9 corresponding to the communication signal 25.

In comparison with the prior art, in this way, the advantage is achieved that, in order to superimpose the interface current 6 with the current signal 9, no additional superposition means have to be provided, but instead, the first controllable input means 4 which is already present for providing the load voltage 7 is used. Thus, by maintaining the same functionality, the circuit complexity of the field-device coupling unit 10 can be decisively reduced, as a result of which the construction thereof is simplified and, for this reason, said unit is more cost-effective to produce and less prone to errors.

In the example shown in FIG. 1, the load voltage 7 is supplied to the circuit arrangement 8 so that said circuit arrangement can generate the supply voltage 2 therefrom. Alternatively, however, it is also possible for the supply voltage 2 and the load voltage 7 to be the same; that is that the load voltage 7 is used directly as the supply voltage 2. In both cases, the supply voltage 2 is based on the load voltage 7.

The supply voltage 2 is used for example as a supply voltage for an actuator (not shown here) of the field device 5. Alternatively or additionally, the supply voltage 2 or the load voltage 7 can also be used as a supply voltage for the circuit arrangement 8 and/or other circuit portions or electronic components of the field device 5.

Figure 2:
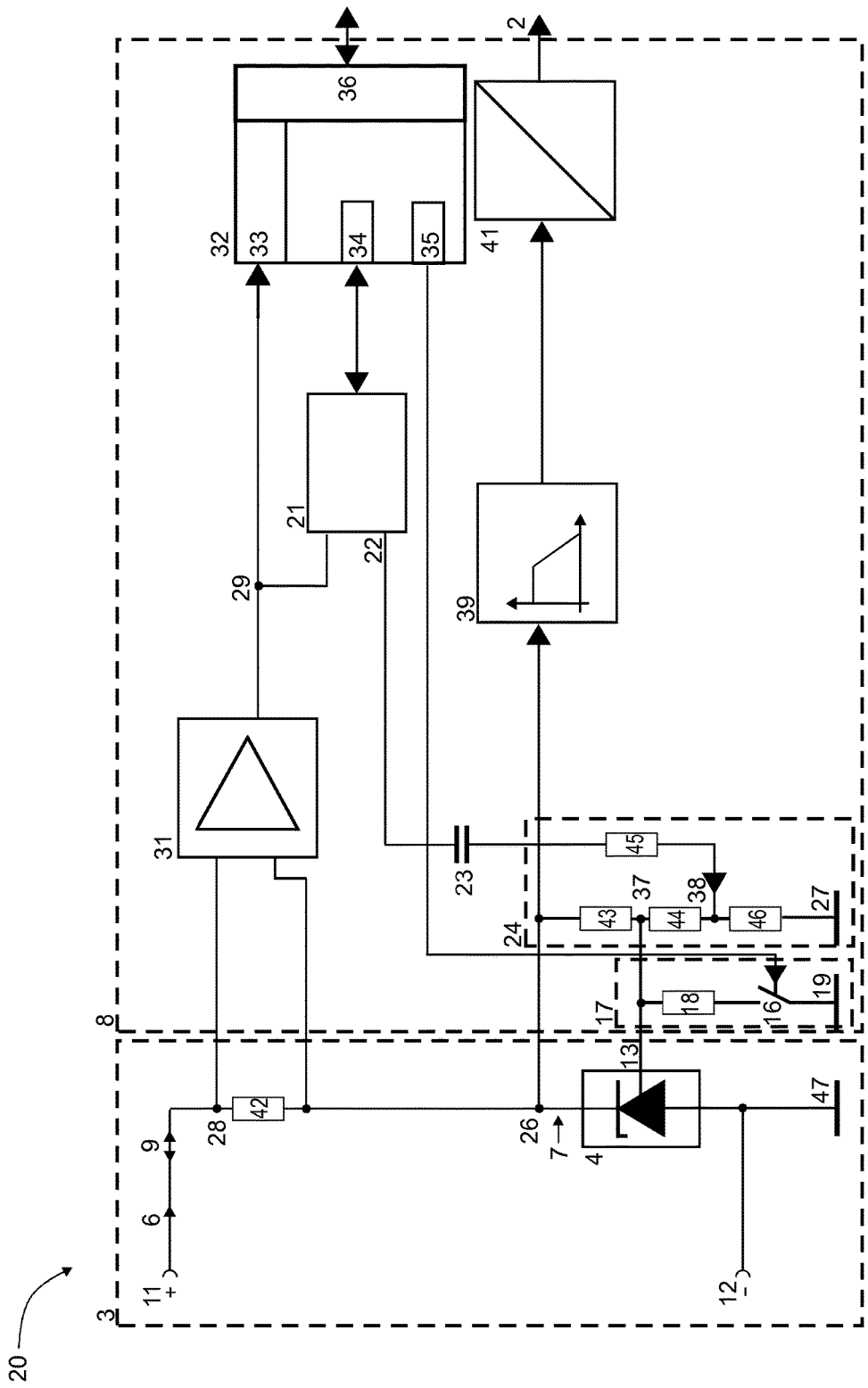
FIG. 2 is a schematic block diagram of a second embodiment of a field-device coupling unit.

FIG. 2 shows a second embodiment of a field-device coupling unit 20. The second embodiment represents a development of the first embodiment, in particular in relation to the current interface 3 and the circuit arrangement 8.

The basic function of the second embodiment corresponds to that of the first embodiment and shall not be repeated at this point.

According to the second embodiment, the current interface 3 comprises, as the first controllable input load 4, a shunt voltage regulator having three connection points. The first connection point 26 is electrically connected to the first line connection 11, and the second connection point is electrically connected to the second line connection 12. The third connection point is in the form of a first reference input 13. The circuit arrangement 8 is configured to control said reference input 13 according to the communication signal 25.

According to one possible form of the second embodiment, the component ZETEX ZHT431 from the company Diodes Incorporated is used as a shunt voltage regulator. In this case, the terminal Vz is used as the first connection point 26, the terminal GND is used as the second connection point, and the terminal VREF is used as the third connection point or as the reference input 13.

The first controllable input load 4 in the form of a shunt voltage regulator is configured in particular to limit the load voltage 7 to or to below a set voltage value.

To set this voltage value, the circuit arrangement 8 comprises a voltage divider assembly 24 which, in the example shown, comprises three ohmic resistors, specifically a first resistor 43, a second resistor 44 and a third resistor 46. The three resistors are connected in series between the first connection point 26 and a ground node 27, the first resistor 43 being connected to the first connection point 26, and the third resistor 46 being connected to the ground node 27. Preferably, the second line connection 12 is connected to a ground node 47 so that the ground node 27 is effectively connected to or short-circuited with the second line connection 12. The voltage divider assembly 24 is connected in parallel with the first controllable input load 4. The first resistor 43 is connected to the second resistor 44 via a first circuit node 37. The second resistor 44 is connected to the third resistor 46 via a second circuit node 38. The first circuit node 37 is further connected to the first reference input 13, so that the voltage applied to the first circuit node 37 is supplied to the first reference input 13 as the first reference voltage.

The circuit arrangement 8 has a modem means 21 which, at the output terminal 22 thereof, provides the communication signal 25 to be transmitted to the control unit 1. The output terminal 22 is electrically coupled to the reference input 13 by means of the capacitor 23. In the example shown, the coupling takes place via the voltage divider assembly 24 so that the communication signal 25 on the control path to the first reference input 13 is scaled in such a way that the current signal 9 resulting from the coupling of the communication signal 25 has a desired amplitude, preferably an amplitude which is compatible with the HART protocol. For this purpose, the capacitor 23 is connected to the second circuit node 38 via a fourth resistor 45.

Alternatively to the above-described connection of the output terminal to the reference input 13, the output terminal 22 can also be coupled directly to the reference input 13 by means of the capacitor 23. The scaling of the communication signal 25 can then take place for example in the modem means 21.

The modem means 21 is preferably in the form of a HART modem and configured to provide a communication signal 25 which is compatible with the HART protocol, such as a FSK signal. The modem means 21 can be in the form of a stand-alone component or chip, or a functional unit of a microcontroller, FPGA or ASIC.

The current interface 3 is preferably based on an analogous current interface, such as on the known 4-20 mA current interface, so that the interface current can assume levels between 4 and 20 mA.

A fifth resistor 42 is connected in series with the first controllable input load. Preferably, the fifth resistor 42 is located between the first line connection 11 and the first connection point 26. The fifth resistor 42 is a shunt resistor which converts the current flowing through the current interface into a voltage signal and supplies said signal to an instrumentation amplifier 31. The instrumentation amplifier amplifies the voltage signal and provides said signal to a third circuit node 29 which is connected to an input terminal of the modem means 21. The modem means 21 processes the voltage signal, in that it carries out for example a demodulation, and transmits the information obtained from the voltage signal to the processor means 32. In this way, current signals transmitted from the superordinate control unit 1 to the field device 5 or the field-device coupling unit 20 can be received.

An A/D converter 33 of a processor means 32 is further connected to the circuit node 29. The A/D converter 33 is used in particular to detect the level of the voltage applied to the circuit node 29 in order to thus determine the level of the interface current and thus the information mapped onto the level of the interface current.

The processor means 32 further comprises a data interface 34, a control output 35 and a control signal interface 36. The data interface 34 is preferably in the form of a UART interface and is used to transfer the information to be transmitted to the superordinate control unit 1 to the modem means 21 so that said means generates a corresponding communication signal 25 for example by means of modulation. The data interface 34 is further used to receive a data signal from the modem means 21, which signal contains for example the above-mentioned information obtained from the voltage signal. The control output 35 is preferably in the form of a RTS output and is used for example to control or operate a switch 16 described in the following. The control signal interface is generally used to transmit commands or data to, or to receive commands or data from, another functional unit of the field device 5.

In the example shown, the first connection point 26 of the first controllable input load 4 or of the shunt voltage regulator is connected to the input of a low-pass filter 39. Alternatively to the low-pass filter 39, a gyrator can also be used here. The low-pass filter 39 or gyrator relays the DC component of the load voltage 7 for energy supply to a supply path and thereby prevents the current signal 9 from also flowing off in this supply path. For example, a DC-to-DC converter is connected downstream of the low-pass filter 39 or gyrator, and the low-pass filter 39 or gyrator is configured to relay only the DC component of the load voltage 7 or of the interface current 6 to the DC-to-DC converter 41 without a low AC-voltage impedance of the input thereof being able to have a disruptive influence on the current signal 9. The low-pass filter or gyrator is preferably configured as a second order filter.

The DC-to-DC converter 41 is preferably configured as a buck/step-down converter and is used for power conditioning of the load voltage 7 so that a steady power supply can be provided to electronics assemblies connected downstream. The DC-to-DC converter 41 is additionally configured to ensure a defined switching-on and off of the output voltage thereof in a specific voltage range of the charging capacitor thereof.

The first reference input 13 or the first circuit node 37 is further connected to a voltage branch 17. The voltage branch 17 comprises a sixth resistor 18 and a switch 16, which are connected in series with one another. The voltage branch 17 is additionally connected to a ground node 19. The switch 16 is operated by means of a control output 35 of the processor means 32. If the switch 16 is connected in a conductive manner, the voltage applied over the voltage divider assembly 24 is divided between the first resistor 43 and the resulting resistance of the interconnected resistors 44, 46 and 18. Since, by connecting the sixth resistor 18, this resulting resistance is reduced, the first reference voltage applied to the first reference input is reduced. The circuit branch 17 is thus used to selectively reduce the first reference voltage. Preferably, the processor means 33 is configured to bring about a reduction in the reference voltage at least when the modem means 21 outputs the communication signal 25.

The voltage branch 17 is not required in the second embodiment and can also be omitted.

The above-described elements or means provided with the reference signs 17, 21, 24, 32, 33, 34, 35, 39, 41, 42 are shown in combination in FIG. 2. However, said elements can also be provided in isolation and independently of one another, for example in the context of the field-device coupling unit 10 shown in FIG. 1.

The above-described elements or means provided with the reference signs 17, 21, 24, 32, 33, 34, 35, 39, 41, 42 can each be in the form of stand-alone components. Alternatively, said elements or a subgroup of said elements can also be in the form of functional units of a single component, for example of an integrated circuit.

Figure 3:
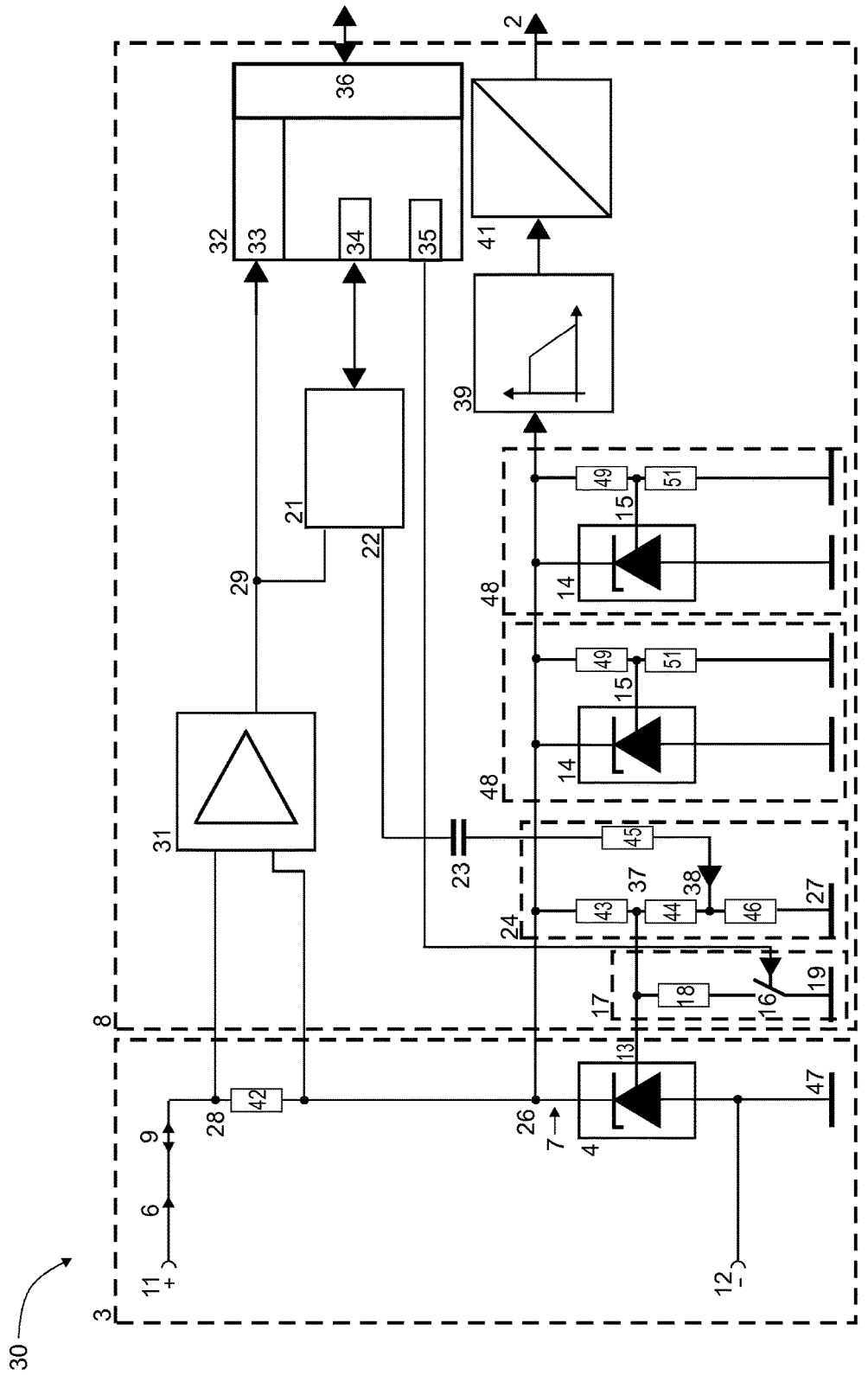
FIG. 3 is a schematic block diagram of a third embodiment of a field-device coupling unit.

FIG. 3 shows a third embodiment of a field-device coupling unit 30. The third embodiment substantially corresponds to the second embodiment, but additionally has two input load assemblies 48, which are connected in parallel with the first controllable input load 4.

The two controllable input load assemblies 48 are provided for reasons of safety in order to still be able to ensure that the load voltage 7 is limited in the case of failure of the first controllable input load 4. The input load assemblies 48 each comprise a second controllable input load 14. The second controllable input load 14 is preferably configured in the same manner as the first controllable input load 4. In particular, the second controllable input load 14 is likewise a shunt voltage regulator, such as the above-mentioned ZETEX ZHT431. The input load assemblies 48 each further comprise a voltage divider. In this case, the voltage divider is formed by the resistors 49 and 51 and connected in parallel with the second controllable input load 14. The second controllable input load 14 comprises a second reference input 15, to which the voltage which can be tapped between the resistors 49 and 51 is applied as a second reference voltage.

In the described parallel connection of the input loads 4 and 14, the problem can arise that one of the second input loads 14 dictates the load voltage 7 dropping over the two input loads 4 and 14 so that the first controllable input load 4 is not capable of achieving the above-described change in the load voltage 7 in order to impress the current signal 9 on the interface current 6.

To solve this problem, the voltage branch 17 is provided, by means of which the first reference voltage applied to the first reference input 13 can be set to below the second reference voltages applied to the respective second reference inputs 15. For this purpose, the resistors of the voltage divider assembly 24, of the input load assemblies 48 and of the circuit branch 17 are dimensioned accordingly. In particular, said resistors are dimensioned in such a way that the sum of a first reference voltage and a superimposed communication signal 25 is also lower than the second reference voltage.

By means of the reduced first reference voltage, it is ensured that the load voltage 7 is dictated by the first controllable input load 4 so that said load is capable of superimposing the current signal 9 on the current interface 6 by changing the load voltage 7.

Alternatively to the example shown, the circuit branch 17 can also be provided in each case at the second reference inputs of the input load assemblies 48. In this case, the processor means 32 is configured in such a way that the switch 16 is opened when transmitting the communication signal 25 so that the second reference voltage is thereby raised to above the first reference voltage.

As an additional alternative, it is also possible to omit the circuit branch 17 and to configure the resistors of the voltage divider assembly 24 or of the input load assemblies 48 in such a way that the first reference voltage is permanently below the second reference voltages.

Figure 4:
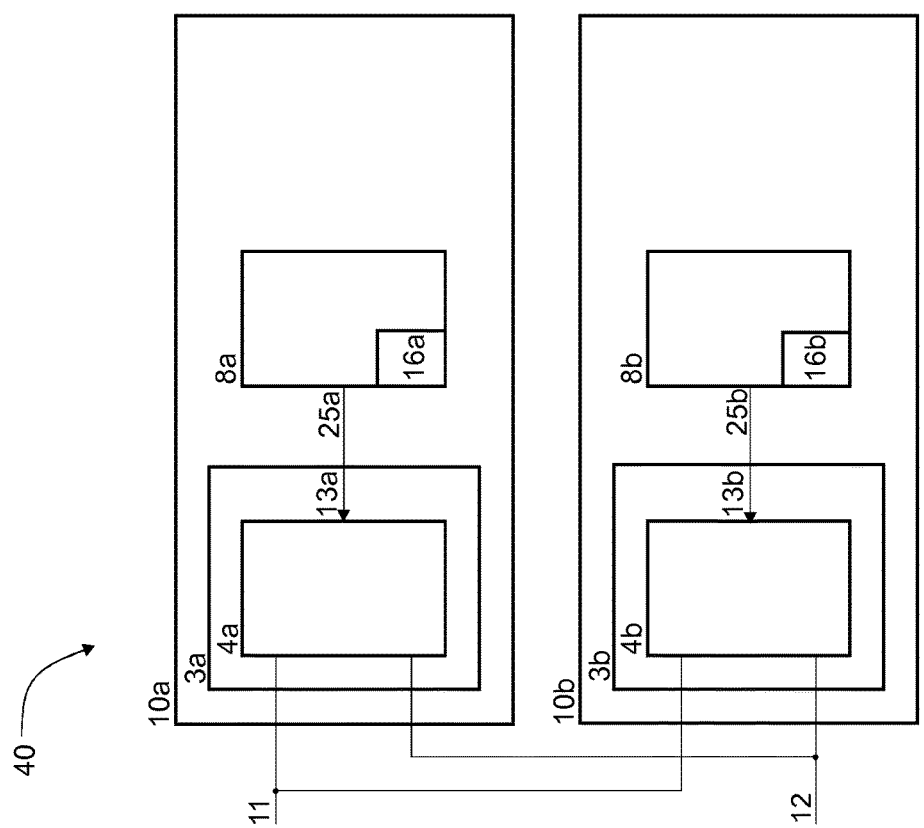
FIG. 4 shows a system composed of two field-device coupling units connected in parallel.

FIG. 4 shows a system 40 composed of at least one first and one second field-device coupling unit 10a and 10b. The first and second field-device coupling units are configured according to one of the above-described field-device coupling units. The components described in the following of the first and second field-device coupling units 10a and 10b are configured in the same manner as the above-described components of the same name. These components shall not be described again at this point. The current interfaces 3a and 3b of the two field-device coupling units 10a and 10b are connected in parallel with one another and thus share the first line connection 11 and the second line connection 12. The circuit arrangement 8a of at least the first field-device coupling unit 10a is configured, at least whilst providing the communication signal 25a to the first field-device coupling unit 10a, to set a first reference voltage, which is applied to a first reference input 13a of the first controllable input load 4a of the first field-device coupling unit 10a, by operating a switch 16a, to below a first reference voltage which is applied to a reference input 13b of the first controllable input load 4b of the second field-device coupling unit 10b. Alternatively or additionally, the circuit arrangement 8b of the second field-device coupling unit 10b is configured, at least whilst providing the communication signal 25a to the first field-device coupling unit 10a, to set the first reference voltage of the second field-device coupling unit 10b, by operating a switch 16b, to above the first reference voltage of the first field-device coupling unit 10b.

The two field-device coupling units 10a and 10b can be used in respective field devices 5, which are not shown in FIG. 4.

According to the fourth embodiment, the two field-device coupling units 10a and 10b or the current interfaces 3a and 3b thereof are connected in parallel and can thus be connected to a single current interface of a superordinate control unit and be powered thereby. In this case, however, the problem already described above arises—namely that in the case of the parallel connection of two input loads, the respective input load having the lower reference voltage dictates the load voltage dropping over the input loads. In order to solve this problem, in this embodiment, at least the circuit arrangement 8a is configured, by operating the switch 16a, to decrease the reference voltage applied to the first reference input 13a so that said voltage is below the reference voltage of the first controllable input load 4b of the second field-device coupling unit 10b. Preferably, both field-device coupling units are equipped with a corresponding switch 16a and 16b respectively, so that either the reference voltage of the first field-device coupling unit 10a or that or the second field-device coupling unit 10b is selectively set to below the reference voltage of the respective other field-device coupling unit 10a and 10b respectively so that it is possible for the two field-device coupling units 10a and 10b to superimpose the current signal 9 in the above-described manner by means of a corresponding control of the respective first controllable input loads 4a and 4b respectively.

When a plurality of field-device coupling units are connected in parallel, it is advantageous to set the level of the interface current to a fixed value, such as 20 mA, so that each of the field-device coupling units 10a, 10b or each of the associated field devices can be powered sufficiently. The communication then takes place exclusively by means of the current signal 9.

The invention claimed is:

1. A field-device coupling unit for providing a supply voltage for a field device and for communication with a superordinate control unit, the field-device coupling unit comprising a current interface, which is configured for communication with the control unit and has a first controllable input load which is configured to provide, from an interface current of the current interface, a load voltage on which the supply voltage is based, the field-device coupling unit further comprising a circuit arrangement for providing a communication signal which is to be transmitted to the control unit, wherein the circuit arrangement is configured to control the first controllable input load according to the communication signal in order to superimpose the interface current with a current signal corresponding to the communication signal.

2. The field-device coupling unit according to claim 1, wherein the first controllable input load comprises a voltage regulator, and wherein the circuit arrangement is configured to control the voltage regulator according to the communication signal.

3. The field-device coupling unit according to claim 1, wherein the first controllable input load is configured to limit the load voltage to or below a set voltage value.

4. The field-device coupling unit according to claim 1, wherein the current interface comprises a first and a second line connection, and wherein the first controllable input load is connected in series between the two line connections.

5. The field-device coupling unit according to claim 1, wherein the first controllable input load has a first reference input and is configured to change the load voltage according to a change in the voltage applied to the first reference input, and wherein the circuit arrangement is configured to supply a first reference voltage to the first reference input and to superimpose the first reference voltage with the communication signal.

6. The field-device coupling unit according to claim 5, wherein, in parallel with the first controllable input load, at least one second controllable input load is connected, which comprises a second reference input, to which a second reference voltage is applied, and wherein the reference inputs of the controllable input loads are connected in such a way that the first reference voltage is permanently below the second reference voltage.

7. The field-device coupling unit according to claim 5, wherein, in parallel with the first controllable input load, at least one second controllable input load is connected, which comprises a second reference input, to which a second reference voltage is applied, and wherein in that the circuit arrangement is configured, by operating a switch, to set the first reference voltage to below the second reference voltage and/or is configured, by operating a switch, to set the second reference voltage to above the first reference voltage.

8. The field-device coupling unit according to claim 7, wherein the circuit arrangement comprises a first circuit branch which has the switch and a resistor, the circuit branch preferably being connected between a ground node and the first or the second reference input.

9. The field-device coupling unit according to claim 5, wherein the circuit arrangement comprises a modem means which is configured to provide the communication signal to an output terminal, and a capacitor connected between the output terminal and the first reference input, and is configured to couple the communication signal provided to the output terminal into the first reference input by means of the capacitor.

10. The field-device coupling unit according to claim 9, wherein, characterised in that, between the output terminal of the modem means and the first reference input, a voltage divider assembly is provided, which is configured to scale the amplitude of the communication signal superimposing the first reference voltage by a predetermined factor.

11. The field-device coupling unit according to claim 10, wherein the voltage divider assembly is further used to provide the first reference voltage, the voltage divider assembly being connected between a first connection point of the first controllable input load and a ground node.

12. The field-device coupling unit according to claim 1, wherein the field-device coupling unit is configured to operate the circuit arrangement based on the load voltage and/or the supply voltage.

13. The field-device coupling unit according to claim 1, wherein the current interface is a 4-20 mA current interface.

14. The field-device coupling unit according to claim 1, wherein the field-device coupling unit is configured to communicate with the control unit by means of the current interface according to the HART protocol, the circuit arrangement being configured to provide the communication signal in such a way that the current signal superimposing the interface current is compatible with the HART protocol.

15. A system comprising at least a first and a second field-device coupling unit according to claim 1, wherein the current interfaces of the two field-device coupling units are connected in parallel to one another, and wherein the circuit arrangement of at least one of the field-device coupling units is configured, at least whilst providing the communication signal to the first field-device coupling unit, to set a first reference voltage, which is applied to a reference input of the first controllable input load of the first field-device coupling unit, by operating a switch, to below a first reference voltage which is applied to a reference input of the first controllable input load of the second field-device coupling unit, or is configured, at least whilst providing the communication signal to the first field-device coupling unit, to set the first reference voltage of the second field-device coupling unit, by operating a switch, to above the first reference voltage of the first field-device coupling unit.

* * * * *